Sept. 29, 1942.   A. LICHTE   2,297,231

INTERNAL COMBUSTION ENGINE

Filed July 5, 1939

AUGUST LICHTE, Inventor

By Bailey, Stephenson & Huettig

Attorneys

Patented Sept. 29, 1942

2,297,231

UNITED STATES PATENT OFFICE 2,297,231

INTERNAL COMBUSTION ENGINE

August Lichte, Dessau-Alten, Germany, vested in the Alien Property Custodian

Application July 5, 1939, Serial No. 282,907
In Germany July 6, 1938

3 Claims. (Cl. 123—139)

This invention relates to a method of and apparatus for controlling the amounts of fuel to be injected into internal-combustion engines of the injection type with spark ignition and particularly to engines of the kind for use in craft.

An object of this invention is to produce a more efficient fuel regulation for an internal combustion engine in response to changes in the intake manifold and atmospheric pressures.

Figure 1:
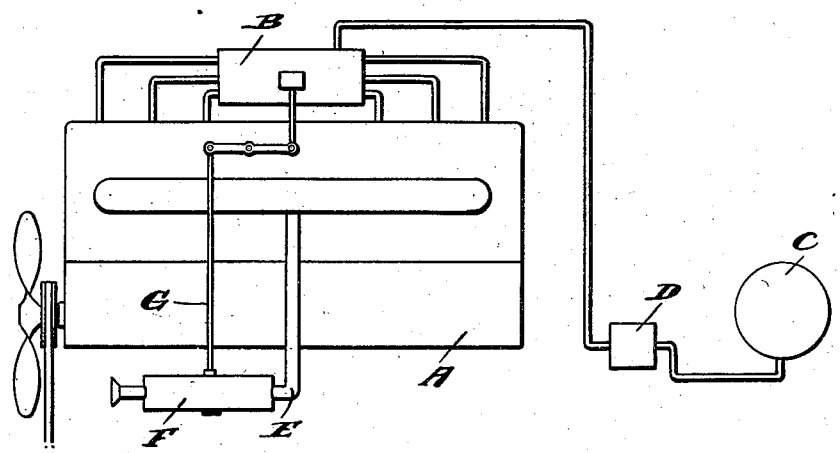
Figure 2:
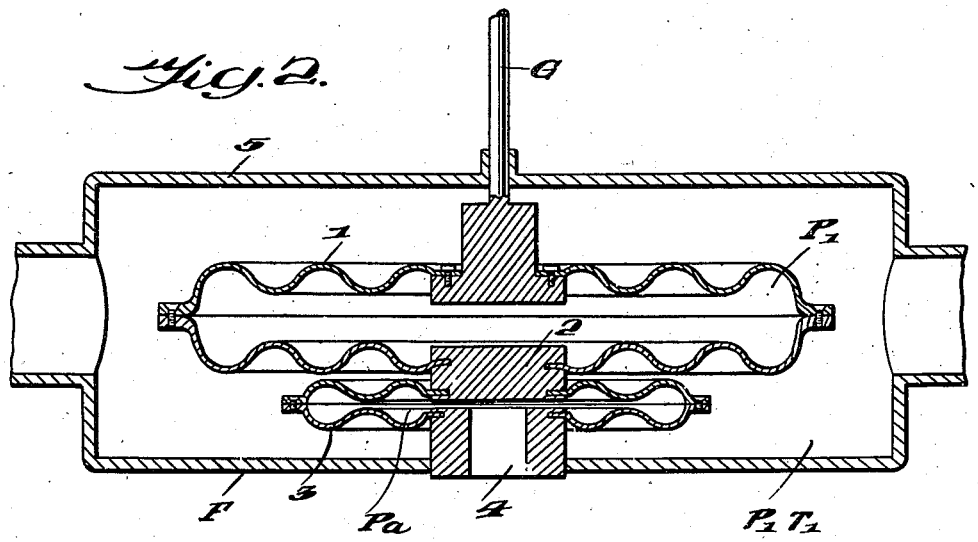

This and other objects of the invention may be more fully understood with reference to the accompanying drawing in which:

Fig. 1 is a diagrammatic view of a fuel system for an engine, and including this invention; and Fig. 2 is cross-sectional view through the fuel controlling device of this invention.

In Fig. 1, the fuel for engine A is supplied by injection pump B served from tank C and fuel pump D. Air intake manifold E includes a regulating device F, shown in detail in Fig. 2, which is connected to injection pump B by a control rod system G.

The amount of fuel to be introduced into the air of combustion of an internal-combustion engine should correspond with the weight of the air contained in the cylinder after the super-charging is completed.

Since the weight of this amount of air cannot be directly ascertained and utilised for control purposes, it is necessary to employ for the control an indirect determination on the basis of the magnitude of the physical factors influencing the weight of said air, for example:

The charging pressure $p_1$, that is the pressure in front of the intake valves of the cylinders, of the charging air passing to the working cylinders, The temperature $T_1$ of the charging air, and The engine $n$.

The greatest influence on the weight of the charging air is that exerted by the charging pressure $p_1$ at or in front of the intake valves.

The pressure drop occuring in the intake air on entering the combustion chamber as the result of the throttling effect set up in flowing through the intake ports, is a constant in the case of each type of motor at a certain speed, so that the charging pressure $p_1$ at or in front of the intake valves may be employed as a control factor.

On the other hand the temperature $T_1$ of the charging air changes in passing through the intake ports, and also changes in the combustion chamber owing to the mixing of said air with the residual exhaust gases, and to the absorption of heat from the hot cylinder walls. By reason of the heating of the air and the resulting increase in its specific volume, the total capacity of the cylinders being a fixed quantity, a diminution in the amount of the charge occurs by comparison with the condition established by the temperature in front of the valves. This change should be estimated by taking into consideration the temperature in front of the valves. The higher the temperature of the charging air in front of the valves the smaller is the decrease in the amount of the charge as the result of the heating in the cylinder.

The speed $n$ of the engine determines the duration of the flow of the charging air into the working cylinder. The volume of air entering each intake port decreases steadily as the engine speed increases and vice versa.

The composition of the air enclosed in the cylinder at the end of the charging period is determined by the mingling of the exhaust gases left in the cylinder with the admitted fresh air.

In engines running on the 4-stroke cycle and without super-charging, the proportions of this mixture are determined by the amount of exhaust gases left in the cylinder at the end of the piston exhaust stroke and after the exhaust valve is closed, and the amount of fresh air induced by the suction stroke.

In engines functioning on the 2-stroke cycle or on the 4-stroke cycle with super-charging, the composition of the charge is determined by the extent or sufficiency of the scavenging. This, however, depends on the difference ($p_1-p_a$) between the charging pressure $p_1$ and the pressure $p_a$ in the exhaust space, that is the space beyond the exhaust ports.

In the control arrangements hitherto known for internal-combustion engines, these physical magnitudes determining the amount of fuel to be injected were only partially and inadequately taken into consideration.

Many of the known control arrangements function in accordance with the formula $$b = C_1.p_1 + C_2.T_1$$

in which $b$ represents the amount of fuel, $C_1$ and $C_2$ are constants; $p_1$ the charging pressure and $T_1$ the absolute temperature of the inflowing air charge in front of the intake valves. This kind of control has the drawback, in addition to ascribing a practically excessive influence to the temperature $T_1$ that two separate indicators or factors are required, for example, one responding to the pressure and one to the temperature. The destruction of one of these indicators especially that which is sensitive to the pressure, necessarily disturbs the controlled supply of fuel to the engine in such a manner that the engine cannot continue to run in the absence of counteracting auxiliary appliances. Above all, however, this formula does not take into consideration the diminution of the charge as the result of the pressure difference $(p_1-p_a)$.

Other known control arrangements function in accordance with the formula $b=C_1.p_1.T_1{}^m$. In this case $m$ is a value to be determined by practical experiment. This formula is more in accordance with practical conditions than the one first mentioned. It also allows a single indicator to be employed which responds to both pressure and temperature. However, this formula also fails to take into consideration the diminution of the charge owing to the difference $(p_1-p_a)$ between the charging pressure and that beyond the valves.

In the case of modern high-capacity internal-combustion engines especially those for aircraft, the existing control arrangements are no longer sufficient owing to their lack of the accuracy and sensitiveness essential in said engines for attaining greater efficiency in all settings and in all altitudes of flight.

According to the invention the defects of the known methods of control are remedied by means of a new method of control and a control arrangement for carrying out said method which provides an accurate control. The formula on which this new method is based is expressed by: $b=C_1.p_1.T_1{}^m+C_2.(p_1-p_a)+f(n)$. Here $b$ is the amount of fuel, $p_1$ the charging pressure and $T_1$ the absolute temperature of the air charge in front of the admission valves, $m$ an exponent based on practical experience, $C_1$ and $C_2$ two constants, $p_a$ the external pressure and $f(n)$ a function of the engine speed. In this new formula the first value $(C_1.p_1.T_1{}^m)$ takes into account the influence of the pressure $p_1$ and the temperature $T_1$ in front of the intake valves, on the weight of the charge in the cylinder with a uniformity confirmed by practical experience. The second value $C_2.(p_1-p_a)$ takes into account the influence of the pressure difference $(p_1-p_a)$ on the charge in the cylinder, and the final summation expresses the influence of the engine speed $n$ on the weight of said charge.

According to the invention the method is carried out by means of a system of diaphragms sensitive to pressure and temperature and taking into account the first two values of the control formula whilst the influence of the alteration in the charge by the change in the engine speed is controlled by designing the injection nozzle as a choke, and also by designing the control slit of the injection pump in such a manner that as the engine speed falls the delivery of the fuel slightly increases.

As shown in Fig. 2, the device F located in intake manifold E shows two bellows 1 and 3 enclosed in housing 5. Bellow or diaphragm box 1 is filled with gas under a pressure $P_1$ which preferably approximates the charging pressure for engine A under normal continuous operating conditions. A block 2 is common to and connects bellows 1 and 3, the latter being open to atmospheric pressure through vent 4. Bellows 1 is connected to injection pump B by the rod system G, as shown. As bellows 1 and 3 are in the intake manifold, they are subject to the pressure $P_1$ and the temperature $T_1$ of the intake air.

Bellows 1 and 3 are combined to form a system, bellows 1 being sensitive to pressure and temperature in order to comply with the first value $(C_1.p_1.T_1{}^m)$ of the control formula. This box diaphragm has a high resilience constant and must therefore contain a charge of gas under high pressure in order to comply with the formula. By selecting the ratio between the resilience constant and the internal charge, the diaphragm can be kept to a great extent free from strain or tension while the engine is under cruising load.

Filling the box diaphragm with a compressed comparatively dense gas has the particular advantage that in the event of any fracture of the box, the device controlling the charging pressure maintains the pressure in the box at its initial value $p_1$ which preferably approximates to the charging pressure during continuous performance of the engine without manual intervention being necessary. Running under cruising load can therefore be continued without the aid of special auxiliary arrangements.

Bellows 3 takes into account the second value $(C_2 . (p_1 . p_a))$ and the inner wall of this box is exposed to the pressure $p_a$ beyond the exhaust ports of the engine, and the outer wall thereof to the charging pressure $p_1$. These two diaphragm boxes are interconnected mechanically in such a manner that their effects are complementary.

The third summation $f(n)$ of the formula which takes into account the influence of changes in the engine speed is fulfilled by the special design of the injection system.

The pumps employed in existing injection systems deliver an increased amount of fuel as the speed rises. With this object the ports admitting the fuel into the pump chamber are of circular shape. After said ports have been closed, the fuel is delivered from the pump chamber to the injection nozzle through the nozzle pipe. By a suitable choice of dimensions the absolute value of the amount of fuel can be determined or ascertained without, however, being able to modify the quantitative dependence of the amount of fuel on the engine speed.

From the foregoing statement, however, it follows that in order to carry out the method of the present invention the fuel pumps should deliver a reduced amount of fuel as the engine speed increases.

This result is attained on the one hand by designing the injection nozzle as a throttle or choke which during low engine speeds, and therefore few strokes of the pump, allows a larger amount of fuel to pass per unit of time than during higher speeds at which, owing to the greater throttling effect, only a small amount of fuel can issue through the injection nozzle.

Furthermore, however, by suitably designing the admission ports of the pump chamber the drawback of the slow-functioning circular ports can be overcome by arranging that the control edges of the suction ports lie in the same direction as, and in alignment with, the control edges of the pump piston.

This measure enables the fuel pump to be controlled in such a manner that the amount of fuel delivered corresponds with the charge ratio of the engine at the speed of the latter for the time being.

Having now descirbed a means by which the objects of the invention are obtained, I claim:

1. A device for controlling the fuel supply for an internal combustion engine in response to intake manifold pressure, the difference between the intake manifold pressure and atmospheric pressure, and the temperature of the intake air, comprising a first and a second bellows mounted in the intake manifold for the engine, said first bellows being closed and responsive to changes in temperature and pressure in the intake manifold, means for subjecting the interior of said second bellows to atmospheric pressure, and means joining said bellows to each other so that their movements are superimposed in the same direction.

2. A device as in claim 1, said first bellows containing a gas having a pressure substantially equal to the intake manifold pressure at a normally constant engine speed, and said first bellows having a spring constant such that it is substantially free from tension during said constant engine speed.

3. A device for controlling the fuel supply for an internal combustion engine in response to intake manifold pressure, the difference between the intake manifold pressure and atmospheric pressure, and the temperature of the intake air comprising a first and a second bellows each composed of two peripherally joined discs, said first bellows being sealed and containing gas under pressure, said second bellows being open to the atmosphere, means joining the center portion of a disc of one bellows to the center portion of a disc of the second bellows so that the movements of said bellows are superimposed upon each other, and means for connecting the center portion of another disc of one of said bellows to the operating controls for the engine.

AUGUST LICHTE.